United States Patent [19]

Gensike

[11] 4,451,144
[45] May 29, 1984

[54] AUTOMATIC LOADER FOR MICROFICHE DUPLICATORS

[75] Inventor: Karl H. Gensike, Northridge, Calif.

[73] Assignee: Photomatrix Corporation, Santa Monica, Calif.

[21] Appl. No.: 423,525

[22] Filed: Sep. 27, 1982

[51] Int. Cl.³ .................. G03B 29/00; G03B 27/04
[52] U.S. Cl. ................................. 355/99; 355/29
[58] Field of Search .................. 355/99, 29, 64, 19, 355/97, 102, 103

[56] References Cited

U.S. PATENT DOCUMENTS 4,056,321 11/1977 Gensike et al. ..................... 355/99

Primary Examiner—Michael L. Gellner
Assistant Examiner—Brian W. Brown
Attorney, Agent, or Firm—Ralph B. Pastoriza

[57] ABSTRACT

The automatic loader successively transfers individual microfiche from a stack of master microfiche in a hopper to an exposure station in a microfiche duplicator. The duplicator makes a copy of the master microfiche on film carried in the duplicator. The loader then automatically transfers the exposed microfiche to a collecting bin. The arrangement is such that while one master microfiche is being exposed, an already exposed microfiche is being removed and a new master microfiche placed in a ready position for subsequent exposure. A specially designed turntable and cooperating shuttle function in timed sequences to effect the foregoing movements.

7 Claims, 7 Drawing Figures

AUTOMATIC LOADER FOR MICROFICHE DUPLICATORS

FIELD OF THE INVENTION

This invention relates generally to material handling equipment and more particularly to an automatic loader for a microfiche duplicator.

BACKGROUND OF THE INVENTION

Microfiche as a means of storing information has gained wide popularity in the last few years over the conventional system of storing information on microfilm. A microfiche comprises a single film approximately the size of an indexing card and containing rows and columns of individual images to be recorded.

A primary advantage of microfiche is the ease with which it may be handled. Thus, rather than searching through an entire roll of microfilm for selected information, one need only select the appropriate microfiche itself containing the information. Moreover, it is very easy to mail microfiche, duplicate the same in printers and conveniently file the same.

Sophisticated apparatus has been developed for making copies of microfiche from master microfiche. Generally an operator will select the master microfiche of which a copy is to be made and position the same in an exposure station in the duplicating equipment. Duplicating film is normally carried in the equipment itself on which the copy is made. Once a master microfiche has been placed in the exposure station, the making of the duplicate from the roll of duplicate film in the machine and the cutting off of the copy so made is carried out normally automatically. However, an operator in most present day devices must handle the master microfiche to assure that proper positioning of the microfiche in the exposure station is carried out and after exposure the microfiche removed and placed back in master files.

Present day master microfiche utilize dry silver film and this film is very delicate and any contact with human hands should be minimized. Accordingly, there is a real need for automatic equipment to load master microfiche in a duplicator and, after exposure, to remove the master microfiche from the duplicator without the necessity of a person or operator physically handling the microfiche.

BRIEF DESCRIPTION OF THE PRESENT INVENTION

With the foregoing in mind, the present invention contemplates the provision of an automatic loader for microfiche duplicators which will enable automatic duplicating of a plurality of stacked master microfiche and a returning of the master microfiche to a stacked array without the necessity of any human handling of the microfiche itself, once the same have been placed in a starting hopper.

More particularly, and in its broadest aspect, the automatic loader includes a loading station, a function station such as an exposure station in a duplicator, and a collecting bin. First and second microfiche receiving platens are provided at first and second spaced positions. The first position is aligned with and centrally located between the loading station and the bin and the second position is at the function station such as exposure station in a duplicator. Means for successively interchanging the positions of the first and second platens between the first and second positions is provided together with a shuttle means movable back and forth over the first position. The shuttle means includes first and second microfiche pick-up means spaced apart in the direction of travel of the shuttle means such that when the shuttle means is at one end of its travel, the first and second pick-up means are positioned respectively over said loading station and said first position of a receiving platen, and when the shuttle means is at the other end of travel, the first and second pick-up means are positioned respectively over the first position and the bin.

With the foregoing arrangement, when the shuttle means is at one end of travel, microfiche can be picked up from the loading station and microfiche receiving platen simultaneously and when the shuttle means is at the other end of its travel, microfiche can be deposited on the receiving platen at the first station and in the receiving bin simultaneously. The means for interchanging the positions of the first and second platens operates to effect an exchange after each time a microfiche has been deposited on a receiving platen in the first position.

BRIEF DESCRIPTION OF THE DRAWINGS

A better understanding of this invention will be had by now referring to a preferred embodiment thereof schematically illustrated in the accompanying drawings in which.

DETAILED DESCRIPTION OF THE PREFERRED EMBODIMENT

Figure 1:
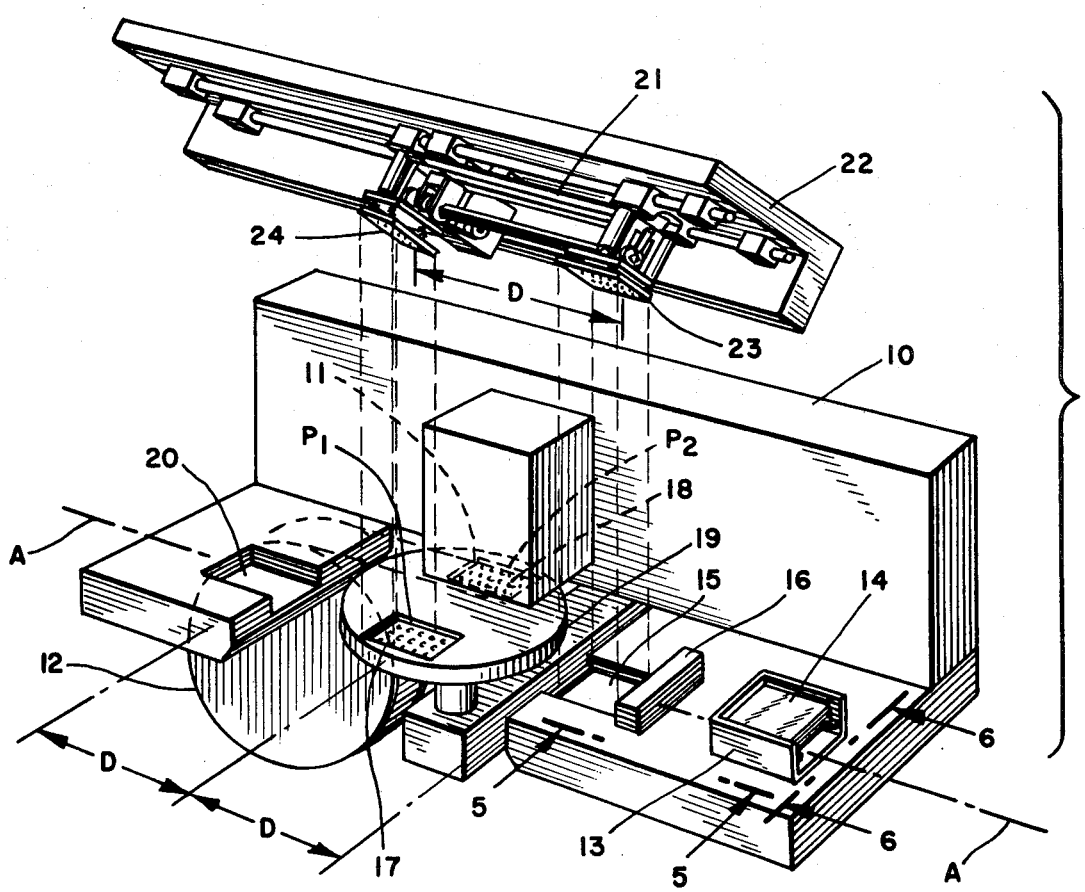
FIG. 1 is an exploded perspective view of the major components of the automatic loader of this invention for use with a microfiche duplicator.

Referring first to FIG. 1, there is shown a microfiche duplicator 10 having an exposure station indicated in phantom lines at 11 for making copies of master microfiche received in the exposure station. Towards this end, there is provided a roll of copy film 12 shown in the lower left portion of FIG. 1 which is automatically fed up to the exposure station 11 so as to be in printing registration with a master microfiche at the exposure station, appropriate exposure of the copy film in the roll 11 being made and then the same cut off to provide a desired copy.

The foregoing is conventional practice in microfiche duplicators. The present invention has to do with an automatic loader for the duplicator 10 of FIG. 1. In essence, this automatic loader will automatically position a master microfiche to be duplicated at the exposure station 11 and after exposure, automatically remove the master microfiche and deposit it in a collecting bin, all without the necessity of any physical handling of the microfiche by an operator.

Briefly, the foregoing automatic loader includes a hopper shown in the right portion of FIG. 1 at 13 for receiving a stack of master microfiche 14 copies of which are to be made. A loading station 15, in turn, is aligned with the hopper 14 along an alignment axis A—A to receive individual microfiche from the hopper 13. Towards this end, there is also provided a microfiche separating means 16 constituting an important feature of the present invention. This separating means functions to transfer one microfiche at a time from the hopper 13 to the loading station 15 all as will become clearer as the description proceeds.

Referring to the central portion of FIG. 1, there are shown first and second microfiche receiving platens 17 and 18. A turntable 19 supports these platens at diametrically opposite positions, the first position designated P1 being aligned with and at a given distance from the loading station 15; that is, the position P1 is aligned with the alignment axis A—A. The second position designated P2 is at the exposure station 11. With this arrangement, rotation of the turntable 19 through 180° moves the first platen 17 to the second position P2 and the second platen 18 to the first position P1. It can be seen, accordingly, that repeated back and forth oscillations of the turntable through 180° successively interchanges the positions of the first and second platens 17 and 18.

Referring to the left portion of FIG. 1, there is shown a microfiche collecting bin 20 for receiving master microfiche from a receiving platen in the position P1 on the turntable 19 after the microfiche has been exposed and the receiving platen has been moved from the second position P2 to the first position P1. This collecting bin 20, as shown, is in alignment with the alignment axis A—A and thus with the receiving platen 17 in FIG. 1 and is spaced the same given distance therefrom as is the loading station 15. As a consequence, the receiving platen at the first position P1 is exactly halfway between the loading station 15 and the collecting bin 20. The referred to given distances between the position P1 and the loading station 15 and collecting bin 20 are designated D in FIG. 1.

Referring now to the exploded portion of the automatic loader above the duplicator 10 of FIG. 1, the same includes a shuttle means 21 mounted to a supporting frame 22 which in turn is normally positioned on the duplicator 10 so that the shuttle means is in a position to move back and forth over the first position P1. As shown in FIG. 1, this shuttle means includes first and second microfiche pick-up means 23 and 24 spaced from each other a given distance D corresponding to the given distance D between the position P1 and the loading station 15 and collecting bin 20 described heretofore.

Figure 2:
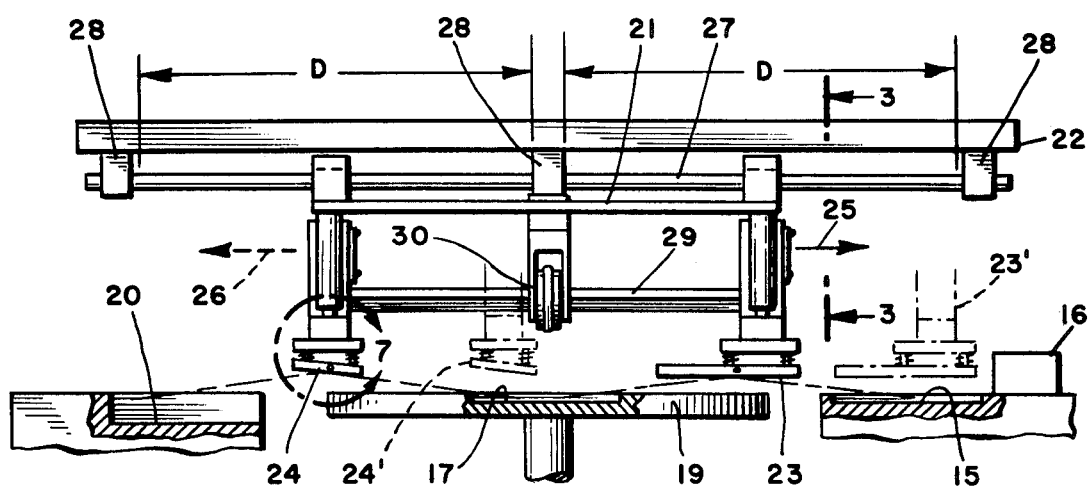
FIG. 2 is a fragmentary front elevational view of the loader of FIG. 1 in assembled relationship.

The extent of travel of the shuttle 21 is also the same distance D as will be clear by now referring to the assembled front view of FIG. 2.

In FIG. 2, the shuttle 21 is shown in a mid position through which it travels when moving from one end of its travel; for example, from the right to the other end of its travel to the left. The solid arrow 25 depicts movement of the shuttle to the right and the dotted line arrow 26 depicts movement to the left.

The shuttle 21 itself is guided for the above referred to movement along guide rails 27 supported to the fixed structure 22 as by guide rail supports 28. Three such guide rail supports are shown, two being at the opposite ends of travel of the shuttle and one at the center.

Pick-up means 23 and 24 include vacuum pick-up plates as will become clearer as the description proceeds. When these plates are lowered from the shuttle to engage a microfiche and a vacuum is applied, the microfiche can be picked up by the means 23 and 24 and when the pick-up means are lowered and the vacuum released, the microfiche will be released. Thus, each of the pick-ups 23 and 24 must be capable of slight vertical movement to effect the picking-up and a depositing as described. Towards the foregoing end, the shuttle includes a square shaft 29 which can be rotated through 180° as by a pulley 30 which is stationary, the square shaft 29 travelling through the pulley as the shuttle moves. The ends of the shaft 29 terminate in wheels such as the wheel 31 shown on the pick-up mechanism 23. This wheel 31 includes a link connecting from the wheel at a peripheral point to an appropriate vertically movable carriage carrying the vacuum plate for the pick-up 23. The arrangement is such that rotation of the square shaft 29 by the pulley 30 will cause an up or downward movement of both pick-up means 23 and 24 simultaneously.

Figure 3:
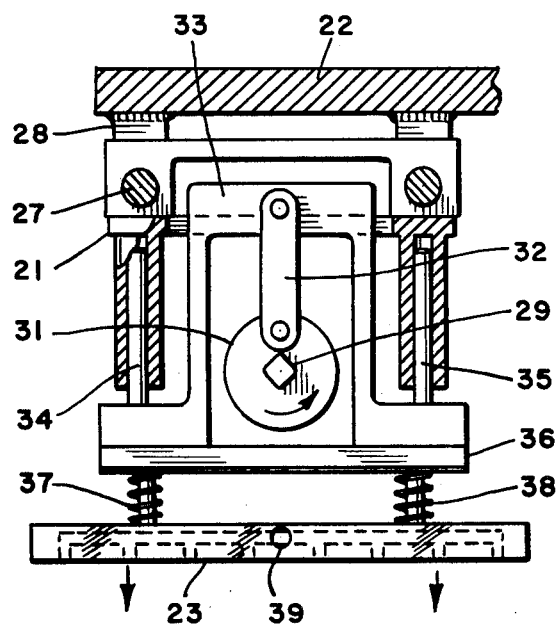
FIG. 3 is an end view partly in cross section of one component of the loader showing the same in a first position looking in the direction of the arrows 3—3 of FIG. 2.

The foregoing will become clearer by referring to the end view of FIG. 3 for the pick-up 23. Since the mechanism for raising and lowering the pick-up is identical for both pick-ups 23 and 24, a detailed description of the structure for the pick-up 23 will suffice to enable an understanding of the operation of the pick-up 24.

With specific reference to FIG. 3, there is shown in end view the square shaft 29 and the wheel 31. The link connecting to a peripheral point on the wheel is shown at 32 connecting to a vertically movable carriage 33. Vertical guiding movement of the carriage is accomplished by pistons 34 and 35 operating in appropriate stationary cylinders on the shuttle 21.

Also clear from FIG. 3 are the rails 27 along which the shuttle rides and the central support visible at 28 secured to the stationary frame 22.

The vacuum plate for the pick-up 23 itself is spring mounted to a mounting plate 36 secured to the bottom of the vertically movable carriage 33 as by springs 37 and 38. This spring mounting permits canting of the vacuum plate for the pick-up 23 so that full surface contact with a microfiche to the picked up or deposited is assured when the carriage 33 is lowered.

Shown in FIG. 3 is a bore opening 39 for receiving a vacuum hose for the vacuum pick-up operation, the various openings on the bottom of the plates for applying vacuum to a microfiche being indicated in dotted lines. In FIG. 3, the carriage 33 is shown in its uppermost position, wherein the vacuum plate for the pick-up 23 is in its raised position.

Figure 4:
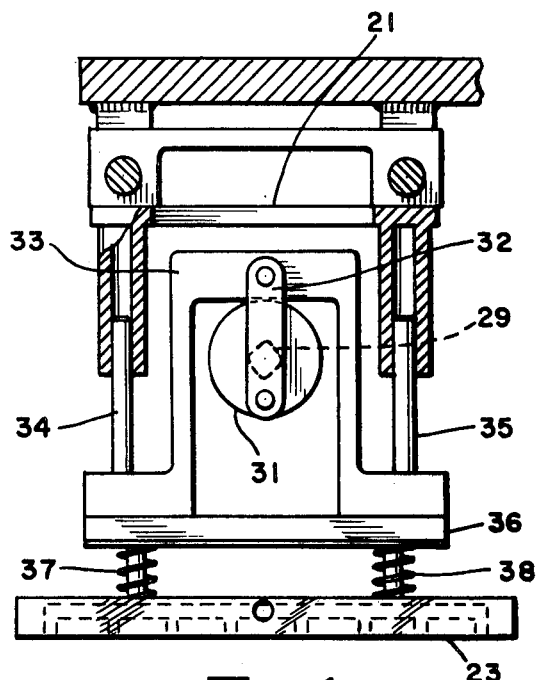
FIG. 4 is a view similar to FIG. 3 but showing the component in a second position.

FIG. 4 shows the same view as FIG. 3, but with the carriage 33 in its lowermost position wherein it will be noted the wheel 31 has been rotated by the square shaft 29 through 180° so that the link 32 has pulled the carriage 33 downwardly, the motion being guided by the pistons 34 and 35. The mounting cushioning springs 37 and 38 will assure, as stated, full surface contact of the vacuum plate with a microfiche to be picked up or deposited and since this vacuum plate can move relative to the mounting plate 36 because of the springs, there is not required high tolerance in the vertical travel forced by the link 32 and wheel 31. Any slight variations in the vertical distance can readily be accommodated by movement of the vacuum plate for the pick-up 23 towards the mounting plate 36.

From the description thus far, and with reference once again to FIG. 2, the operation of the shuttle and turntable will be evident. With reference to FIG. 2, assume that one of the microfiche 14 of FIG. 1 has been transferred from the hopper to the loading station 15. The shuttle 21 is then first moved to one end of its travel; that is, to the right-hand end as viewed in FIG. 2, and as depicted in phantom lines 23'. In this position, the first pick-up 23 will be positioned directly over the loading station 15. While in this position, vacuum is applied to the vacuum plate of the pick-up 23 and the same is lowered over the loading station 15 and then raised to thereby pick-up by vacuum the single master microfiche at the loading station.

The shuttle then moves to the left as viewed in FIG. 2 to its other end of travel at which point the pick-up 23 will now be positioned over the receiving platen 17 on the turntable 19 at which point the first pick-up 23 is again lowered and the vacuum released to deposit the microfiche on the receiving platen 17. After the microfiche has been deposited, the turntable 19 is rotated 180° to position this master microfiche at the second position P2 described in FIG. 1; that is, at the exposure station in the duplicator 10.

While the master microfiche is being exposed at the exposure station 11 described in FIG. 1, the shuttle returns to its one end position depicted in phantom lines in FIG. 2 and will pick up a second microfiche which has in the interim been deposited at the loading station 15. The process is repeated, the shuttle then depositing the second microfiche in the other platen 18 which has assume the first position P1 in FIG. 1 after the turntable 19 was initially rotated 180°.

After depositing this second microfiche, the turntable 19 is then again rotated 180° to position the second master microfiche at the exposure station and to remove the already exposed first microfiche to the first position P1. In the meantime, the shuttle 21 has again returned to its one end of travel to the right in FIG. 2 so that the first pick-up 23 can pick up a third master microfiche from the loading station 15. At the same time, the second pick-up 24 is lowered simultaneously with the first pick-up 23 so that the already exposed first microfiche in the receiving platen of the turntable will be picked up by the second pick-up 24 and transferred to the collecting bin 20 simultaneously with the picking up and depositing of the third master microfiche onto the receiving platen.

After depositing of the third master microfiche on the receiving platen, the turntable 19 is rotated back 180° to position the now-exposed second master microfiche in the first position P1 so that this microfiche can be picked up by the second pick-up means 24 simultaneously with the picking up of a fourth master microfiche from the loading station 15.

The foregoing process is repeated, it being evident that the shuttle after the process has started will always be picking up two microfiche simultaneously and depositing two microfiche simultaneously. In other words, at the one end of travel to the right in FIG. 2, the first pick-up means 23 is always positioned over the loading station 15 and the second pick-up means 24 is always positioned over the receiving platen in the first position P1. When the shuttle travels to its other end of travel, the first pick-up 23 is always positioned over the receiving platen in its first position while the second pick-up means 24 is always positioned over the collecting bin 20.

The foregoing operation is highly efficient since while one microfiche has been exposed, the second microfiche is being properly positioned on the turntable and simultaneously the previous microfiche has been removed and is being deposited in the collecting bin 20.

In the foregoing description, the loading station 15 has been described as always having a single microfiche ready for pick-up by the first pick-up means 23 when the shuttle is moved to its one end or right-hand position in FIG. 2. This microfiche in each instance is transferred from the hopper 13 described in FIG. 1, but in order to assure that only the single microfiche is so transferred, the separating means represented by the block 16 in FIGS. 1 and 2 is provided.

Figure 5:
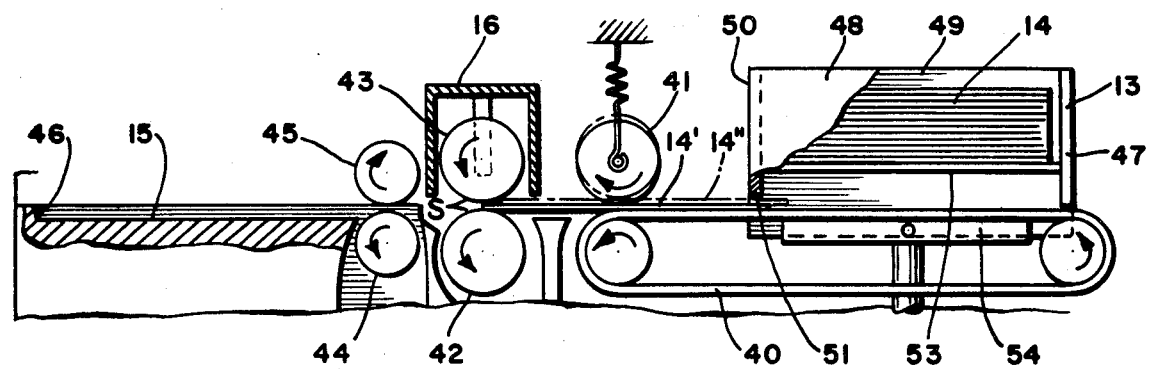
FIG. 5 is a fragmentary view partly broken away of a part of the automatic loader looking in the direction of the arrows 5—5 of FIG. 1.

Referring now to FIG. 5, this separator means will be described in greater detail. Referring first to the right-hand portion of FIG. 5, there is again shown the hopper 13 for holding a stack of master microfiche 14 as described in FIG. 1. Shown in the cut-away portion is a conveyor system 40 for transferring a single microfiche from the stack 14 towards the loading station 15. However, since the microfiche are extremely thin, even though precautions are taken in the design of the hopper to select only the single microfiche from the bottom of the stack 14, sometimes an additional one or two microfiche can be withdrawn from the hopper and transported by the conveyor 40. As an example, there is shown a microfiche 14' in solid lines being passed from the hopper by the conveyor 40 with a second microfiche indicated by phantom lines at 14" adhering thereto.

As shown, the microfiche initially passes through a spring loaded roller 41 to hold the same flat on the conveyor and trackway for the microfiche. The separating means 16 itself includes lower and upper rollers 42 and 43 receiving therebetween a microfiche. The upper roller periphery is spaced from the lower roller periphery by a distance S greater than the thickness of one microfiche and less than the thickness of two microfiche. Further, the upper roller 43 is caused to rotate in the same direction as the lower roller so that the lower periphery of the upper roller is moving in an opposite direction to the upper periphery of the lower roller. As a consequence, if there is more than one microfiche attempting to pass through the rollers 42 and 43, the roller 43 will "kick back" the upper microfiche which in FIG. 5 is indicated at 14" so that only the one single lower microfiche will pass between the rollers. The spacing S between the roller peripheries can be adjusted in accord with the thickness of microfiche in the hopper.

Also shown in FIG. 5 are further rollers 44 and 45 which are continuously rotating to feed the single microfiche from the separating means 16 onto the loading station 15. The leading edge of the microfiche will engage a stop 46 at the loading station 15 and the continued rotation of the rollers 44 and 45 will assure that the microfiche stays in engagement with the stop 46.

The foregoing arrangement assures a consistent and accurate positioning of a single microfiche in the loading station 15 so that the same can be picked up by the first pick-up means 23 of the shuttle as described heretofore. This proper consistent positioning of a microfiche in the loading station is important since the shuttle operates with great precision and the picking up of the microfiche; that is, its position on the bottom of the vacuum platen for the first pick-up 23 must always be consistent if it is to be deposited properly on the receiving platen of the turntable. The rollers 44 and 45 together with the stop 46 assure this consistent positioning.

The hopper 13 shown in FIG. 5. as mentioned, is designed to select one microfiche at a time from the stack 14 although it is possible that two microfiche may adhere together.

Referring to both FIGS. 5 and 6 together, the manner in which the hopper operates will be described in greater detail.

As shown, the hopper housing designated at 13 has an open front 47, spaced parallel side walls 48 and 49 and a rear wall 50 having an exit opening 51 at its lower end. In FIGS. 1 and 5, the front of the hopper is the right hand portion as viewed for receiving the stack of microfiche 14 while the rear faces towards the loading station and separating means.

Figure 6:
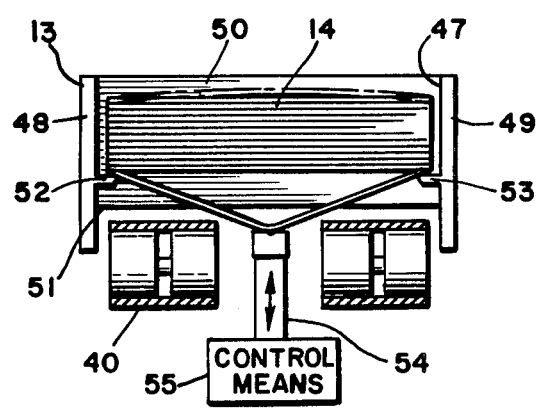
FIG. 6 is a front view of another component of the automatic loader looking in the direction of the arrows 6—6 of FIG. 1; and, FIG. 7 is an enlarged view partly in cross section of a portion of the automatic loader enclosed within the circular arrow 7 of FIG. 2.

As best seen in FIG. 6, there are provided inner opposed horizontally extending lips 52 and 53 on lower portions of the side walls 48 and 49 above the exit opening 51 for supporting the stack 14 of microfiche. The horizontal conveyor means 40 described in FIG. 5 has an initial end in the housing spaced below the lips a given distance and extends rearwardly through the exit opening 51 as shown. A narrow vacuum head structure 54 is elongated in a forward and rearward direction and mounted centrally between the side walls 48 and 49 in the lower portion of the housing for up and down movement between first and second levels above the lips and below the conveyor means, respectively. This up and down movement is indicated by the double-headed arrow in FIG. 6.

The movement of the vacuum head structure 54 is controlled by a control means represented by the block 55 in FIG. 6. This control means programs the motion of the vacuum head to raise the vacuum head to a first level to engage a central underside portion of the bottom microfiche in the stack 14. This causes the stack to assume a slightly convex position when viewed from the top as indicated by the phantom lines in FIG. 6. The vacuum head is then lowered to an intermediate level, between the lips and conveyor means and hesitates at this level for a given time period sufficient that the next-to-bottom microfiche pops up free of the bottom microfiche because of the bending of the microfiche into a concave configuration as shown in FIG. 6. The vacuum head is then lowered to a second level below the conveyor means so that the bottom microfiche is pulled free of the lips and received on the conveyor means 14 for passage out the exit opening 51. In FIG. 6, the bottom microfiche is shown in a position just prior to being pulled free of the lips 52 and 53, the same having been separated from the microfiche immediately above it.

The foregoing hopper operation in and of itself is fully described in U.S. patent appln. Ser. No. 924,970 filed July 17, 1978 and entitled MICROFICHE FEED SYSTEM, now abandoned. However, so far as applicant is aware, this specific hopper design has not been used in combination with an automatic loading system as herein described.

Figure 7:
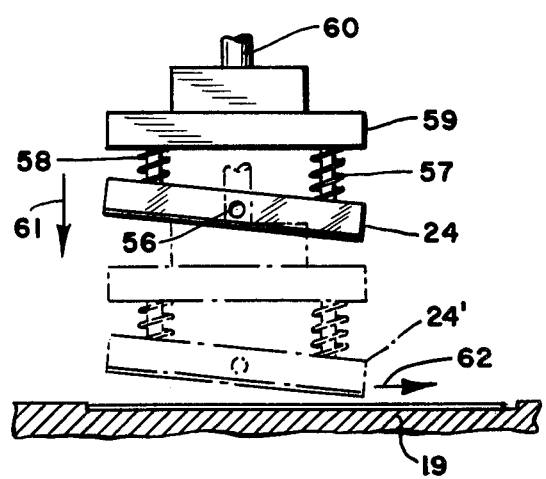

Referring now to FIG. 7, there is shown a further important feature of the present invention. More particularly, this feature concerns the second pick-up means for the shuttle, described in FIG. 2. It has been found that once a master microfiche has been deposited on the smooth glass platen of the turntable 19 and a vacuum applied to hold the master microfiche in place as the turntable rotates to position it at the exposure station, it is very difficult to remove or pick up the microfiche from the smooth platen surface when the turntable has been rotated back and the second pick-up means is positioned to retrieve the exposed microfiche and transfer it to the bin 20. In this respect, the microfiche film itself is very smooth and when in complete surface contact with the glass platen, static friction, electrostatic attraction, and air pressure all combine to make it very difficult to pick-up the microfiche.

In view of the foregoing, the second pick-up means 24 shown in FIG. 2 is designed slightly differently from the first pick-up means 23. This different construction is clearly illustrated in the enlarged fragmentary view of FIG. 7 wherein it will be noted that the vacuum plate for the second pick-up 24 is of smaller dimensions in the direction of the alignment axis A—A and includes a vacuum bore 46 for connection to a vacuum hose similar to the vacuum plate for the first pick-up 23 described in FIGS. 3 and 4. However, this vacuum plate for the second pick-up is spring mounted as by springs 57 and 58 to a mounting plate 59 in such a manner as to assume an acute angle to the horizontal when the mounting plate 59 itself is horizontal. The mounting plate 59 may be secured directly to the bottom of a guide piston shown partially at 60 in FIG. 7 for reception in guide cylinders in the second pick-up, so that up and down movement is appropriately vertically guided as for the first pick-up described in FIGS. 3 & 4.

By mounting the vacuum plate for the second pick-up 24 to the mounting plate 59 at a slight acute angle to the horizontal, when the second pick-up is lowered as indicated by the arrow 61 in FIG. 7, its initial engagement with a microfiche on the turntable 19 is by the rear edge of the plate as is indicated when the plate reaches its initial engagement position shown in phantom lines at 24' in FIG. 7. Continued downward movement of the plate then results in a sliding of the microfiche slightly in the direction of the arrow 62 until the plate reaches a full horizontal position and makes full surface contact with the microfiche. This slight initial sliding of the microfiche serves to break the static friction and air pressure tending to hold the microfiche to the platen so that with vacuum now applied to the vacuum plate of the second pick-up 24 and raising of the second pick-up, the microfiche can easily be lifted from the turntable surface.

As mentioned heretofore, it was found to be very difficult to remove a microfiche from a smooth platen on the turntable by a pick-up of the first type shown at 23 wherein initial engagement of the pick-up plate was full surface contact with the microfiche. The slight sliding effected by the purposely canted pick-up plate for the second pick-up described in FIG. 7 solves the problem by breaking the static friction and air pressure tending to hold microfiche as described.

From all of the foregoing, it will now be evident that the present invention has provided a very efficient automatic loader for microfiche duplicators wherein the entire operation is substantially foolproof in that selection of only one microfiche at a time and proper registration thereof is virtually assured. Moreover, it will be evident that the entire operation can be carried out without requiring any physical handling of the microfiche by personnel other than to initially position a stack in the hopper and remove the finished stack from the collecting bin. Handling of individual microfiche and possible damage to the very delicate and sensitive dry silver surface is thus avoided.

While the invention has been described with respect to a microfiche duplicator, it will be understood that the automatic loader of this invention can be used to position microfiche at a desired function station which might serve some other function apart from an exposure station. The invention, accordingly, is not to be thought of as limited to the specific example set forth for illustrative purposes.

I claim:

1. An automatic loader for successively transferring microfiche from a loading station to a function station and from said function station to a collecting bin, including, in combination;
   (a) first and second receiving platens at first and second spaced positions, said first position being aligned with and centrally located between said loading station and bin and said second position being at said function station;
   (b) means for successively interchanging the positions of said first and second platens between said first and second positions; and
   (c) shuttle means movable back and forth over said first position and including first and second microfiche pick-up means spaced apart in the direction of travel of said shuttle means such that when the shuttle means is at one end of its travel, the first and second pick-up means are positioned respectively over said loading station and said first position of a receiving platen, and when the shuttle is at its other end of travel, the first and second pick-up means are positioned respectively over said first position and said bin whereby when said shuttle means is at said one end of travel microfiche can be picked up from the loading and receiving platen at the first station simultaneously and when the shuttle means is at said other end of travel microfiche can be deposited on the receiving platen at the first station and in the receiving bin simultaneously, said means for interchanging the positions of said first and second platens effecting an exchange after each time a microfiche has been deposited on a receiving platen in said first position.

2. An automatic loader according to claim 1, in which said function station is an exposure station in a microfiche duplicator for making a copy from master microfiche received in the exposure station on film carried in the duplicator, and in which said means for successively interchanging the positions of said first and second platens comprising a flat turntable with said first and second platens carried at diametrically opposite positions on the turntable, said turntable being rotatable back and forth through 180°.

3. An automatic loader according to claim 1, including a hopper for holding microfiche and microfiche separating means disposed between said hopper and said loading station for transferring only one microfiche at a time from said hopper to said loading station.

4. An automatic loader for a microfiche duplicator in which the duplicator has an exposure station for making a copy of a microfiche received in the exposure station on film carried in the duplicator, said automatic loader including, in combination:
   (a) a hopper for holding a stack of master microfiche to be duplicated;
   (b) a loading station adjacent to said hopper;
   (c) microfiche separating means for transferring one microfiche at a time from said hopper to said loading station;
   (d) first and second microfiche receiving platens;
   (e) a turntable supporting said first and second microfiche receiving platens on its surface at first and second diametrically opposite positions, said first position being aligned with and at a given distance from said loading station and said second position being at said exposure station, rotation of the turntable through 180° moving said first platen to said second position and said second platen to said first position, repeated back and forth oscillations of the turntable through 180° successively interchanging the positions of said first and second platens;
   (f) a microfiche collecting bin for receiving a master microfiche from a receiving platen after the microfiche has been exposed and said receiving platen has been moved from said second position to said first position, said collecting bin being in alignment with a receiving platen when in said first position and spaced the same given distance therefrom as is said loading station so that the receiving platen in the first position is exactly halfway between the loading station and the collecting bin; and
   (g) shuttle means movble back and forth through a distance corresponding to said given distance, said shuttle means having first and second microfiche pick-up means spaced from each other by said same given distance whereby when said shuttle means is at one end of its travel, the first and second microfiche pick-up means are positioned over said loading station and a receiving platen respectively so that a new master microfiche can be picked up from said loading station by said first pick-up means simultaneously with the picking up of an already exposed master microfiche on the receiving platen by the second pick-up means, movement of the shuttle to the other end of its travel positioning said first pick-up means over said receiving platen and the second pick-up means over said collecting bin respectively so that the new master microfiche and exposed microfiche picked up when the shuttle was at said one end of its travel can now be deposited on said receiving platen and in said collector bin respectively, said turntable always rotating through 180° after a new master microfiche has been deposited on a receiving platen by said first pick-up means.

5. An automatic loader according to claim 4, in which said separating means includes lower and upper rollers receiving therebetween microfiche from said hopper, said upper roller periphery being spaced from said lower roller periphery by a distance greater than the thickness of one microfiche and less than the thickness of two microfiche, said upper roller rotating in the same direction as said lower roller so that the lower periphery of the upper roller is moving in an opposite direction to the upper periphery of the lower roller whereby if more than one microfiche attempts to pass between the rollers, the upper roller will "kick back" the upper microfiche.

6. An automatic loader according to claim 4, in which said hopper includes a housing for receiving a vertical stack of microfiche, said housing having an open front, spaced parallel side walls and a rear wall having an exit opening at its lower end; inner opposed horizontally extending lips on lower portions of said side walls above said exit opening for supporting said stack of microfiche; horizontal conveyor means having an initial end in said housing spaced below said lips a given distance and extending rearwardly through said exit opening; a narrow vacuum head structure elongated in a forward and rearward direction and mounted centrally between said side walls and the lower portion of said housing for up and down movement between first and second levels above said lips and below said conveyor means, respectively; and vacuum head movement control means for programming the motion of the vacuum head to raise said vacuum head to said first level to engage a central underside portion of the bottom microfiche in said stack, lower said vacuum head to an intermediate level between said lips and conveyor means, hesitate at said intermediate level for a given time period sufficient that the next to bottom microfiche pops up free from the bottom microfiche, and lowers said vacuum head to said second level below said conveyor means so that said bottom microfiche is pulled free from said lips and received on said conveyor means for passage out said exit opening for reception in said separating means.

7. An automatic loader according to claim 4, in which said first and second microfiche pick-up means and said first and second receiving platens are vacuum operated, said first and second pick-up means each including a vacuum plate with means for spring mounting the vacuum plate so that it can assume slight angles from the horizontal and thereby assure a complete, face-to-face contact with a microfiche to be picked up, the vacuum plate associated with said second pick-up means being spring mounted at an acute angle to the horizontal so that initial engagement of the plate with a microfiche on a receiving platen is by the edge of the plate, continued downward movement of the second pick-up means and plate sliding the engaged microfiche in an horizontal direction until the plate moves to a horizontal position and makes full surface contact with the microfiche to thereby break the static friction and air pressure tending to hold the microfiche to the platen.

* * * * *